(12) United States Patent
Sharma et al.

(10) Patent No.: US 11,961,031 B2
(45) Date of Patent: Apr. 16, 2024

(54) SYSTEM AND METHOD TO GAUGE AGENT SELF-ASSESSMENT EFFECTIVENESS IN A CONTACT CENTER

(71) Applicant: NICE LTD, Ra'anana (IL)

(72) Inventors: Harshit Kumar Sharma, Maharashtra (IN); Salil Dhawan, Maharashtra (IN); Rahul Vyas, Rajasthan (IN)

(73) Assignee: NICE LTD., Ra'anana (IL)

( * ) Notice: Subject to any disclaimer, the term of this patent is extended or adjusted under 35 U.S.C. 154(b) by 278 days.

(21) Appl. No.: 17/136,045

(22) Filed: Dec. 29, 2020

(65) Prior Publication Data
US 2022/0207457 A1    Jun. 30, 2022

(51) Int. Cl.
*G06Q 10/0639*    (2023.01)
*G06F 16/22*    (2019.01)
(Continued)

(52) U.S. Cl.
CPC ....... *G06Q 10/06398* (2013.01); *G06F 16/22* (2019.01); *G06Q 10/103* (2013.01);
(Continued)

(58) Field of Classification Search
CPC ........ G06Q 10/00; G06Q 10/02; G06Q 10/10; G06Q 10/103; G06Q 30/00–16;
(Continued)

(56) References Cited

U.S. PATENT DOCUMENTS

| | | | |
|---|---|---|---|
| 2016/0098663 A1* | 4/2016 | Skiba | H04M 3/523 705/7.39 |
| 2016/0105559 A1* | 4/2016 | Ragnet | G06Q 10/06398 379/265.06 |

(Continued)

OTHER PUBLICATIONS

Duggirala et al., An Integrated Framework of Service Quality for Global Delivery of Contact Center Services, 2011 Annual SRII Global Conference, pp. 1-8 (Year: 2011).*

(Continued)

*Primary Examiner* — Robert D Rines
(74) *Attorney, Agent, or Firm* — SOROKER AGMON NORDMAN RIBA

(57) ABSTRACT

A computerized-method for gauging agent's self-assessment effectiveness, is provided herein. The computerized-method includes for each interaction (i) operating a Self-assessment Consolidation module to calculate a confidence-interval for each data-point of one or more preconfigured data-points, and (ii) operating a Self-assessment Divergence Determinant (SDD) module. The operating of the SDD includes: retrieving one or more data-points of the interaction; for each data-point retrieving the confidence interval; setting a divergence-indicator as zero, when the data point is within the confidence-interval; setting the divergence-indicator as a subtraction of the data point from the calculated lower-bound, when the data-point is lower than the lower-bound of the confidence-interval; and setting the divergence-indicator as a subtraction of the calculated upper-bound from the data-point, when the data-point is greater than the upper-bound of the confidence-interval. Then, accumulating the divergence-indicator of the data-points to yield an SDD for the interaction; and sending the SDD to one or more systems.

14 Claims, 10 Drawing Sheets

(51) Int. Cl.
*G06Q 10/10* (2023.01)
*G06Q 30/016* (2023.01)
*H04M 3/523* (2006.01)
*G06F 16/25* (2019.01)

(52) U.S. Cl.
CPC .......... *G06Q 30/016* (2013.01); *H04M 3/523* (2013.01); *G06F 16/252* (2019.01)

(58) Field of Classification Search
CPC . G06Q 30/06398; G06F 16/22; G06F 16/252; H04M 3/523; H04M 3/5237; H04M 3/51; H04M 3/5175; H04M 3/5183; H04M 2203/401
See application file for complete search history.

(56) References Cited

U.S. PATENT DOCUMENTS

| | | | |
|---|---|---|---|
| 2017/0111509 A1* | 4/2017 | McGann | H04M 3/5238 |
| 2019/0320067 A1* | 10/2019 | Pearce | H04M 3/493 |
| 2020/0314242 A1* | 10/2020 | Matula | H04M 3/5183 |
| 2021/0110329 A1* | 4/2021 | Delo | G06Q 10/063112 |
| 2021/0127007 A1* | 4/2021 | Krucek | G06Q 10/1097 |
| 2021/0192536 A1* | 6/2021 | Gokhale | H04L 51/42 |
| 2021/0201246 A1* | 7/2021 | Krucek | H04M 3/5238 |
| 2021/0392230 A1* | 12/2021 | Shah | H04M 3/5175 |
| 2022/0036277 A1* | 2/2022 | Ranganathan | H04M 3/51 |

OTHER PUBLICATIONS

Duggirala et al., An Integrated Framework of Service Quality for Global Delivery of Contact Center Services, Mar. 1, 2011, 2011 Annual SRII Global Conference—IEEE, pp. 557-564 (Year: 2011).*

* cited by examiner

| | Time taken to fill the form | Number of times agent has accessed the interaction during review | Time taken in reviewing the interaction | Number of times sessions were expired | Number of Elaborative comments added in relevant fields | Interaction length | Pattern of selecting identical options across self-assessment form | Incomplete form submission attempts | Number of times intermediated late drafts created | Quantum of change intermediated during intermediate draft creation | Agent's response against controlled questioning |
|---|---|---|---|---|---|---|---|---|---|---|---|
| | 305 | 315 | 320 | 325 | 330 | 335 | 340 | 345 | 350 | 355 | 360 |
| Agent-1 | 3 | 1 | 0.5 | 0 | 5 | 2 | 0 | 0 | 0 | 0 | 2 |
| Agent-2 | 0.5 | 0 | 0 | 0 | 1 | 2.5 | 4 | 0 | 0 | 0 | -2 |
| Agent-3 | 2.92 | 1 | 0.43 | 1 | 4 | 1.5 | -1 | 1 | 1 | 0.3 | -1 |
| Agent-4 | 2.78 | 2 | 0.67 | 1 | 5 | 0.75 | 2 | 1 | 1 | 0.5 | -1 |
| Agent-5 | 5 | 1 | 0.42 | 0 | 3 | 1.33 | 0 | 0 | 0 | 0 | 0 |
| Agent-6 | 6.67 | 2 | 0.83 | 1 | 4 | 2 | 2 | 1 | 0 | 0 | -1 |
| Agent-7 | 3.33 | 1 | 0.75 | 1 | 5 | 1.83 | 2 | 0 | 1 | 0 | 2 |
| Agent-8 | 2.92 | 2 | 0.67 | 1 | 4 | 0.83 | -1 | 1 | 2 | 0.2 | 2 |
| Agent-9 | 13.33 | 0 | 0 | 3 | 10 | 1.5 | -1 | 1 | 1 | 0.3 | -2 |
| Agent-10 | 3 | 1 | 0.5 | 1 | 3 | 1.33 | 3 | 1 | 1 | 0.1 | -1 |

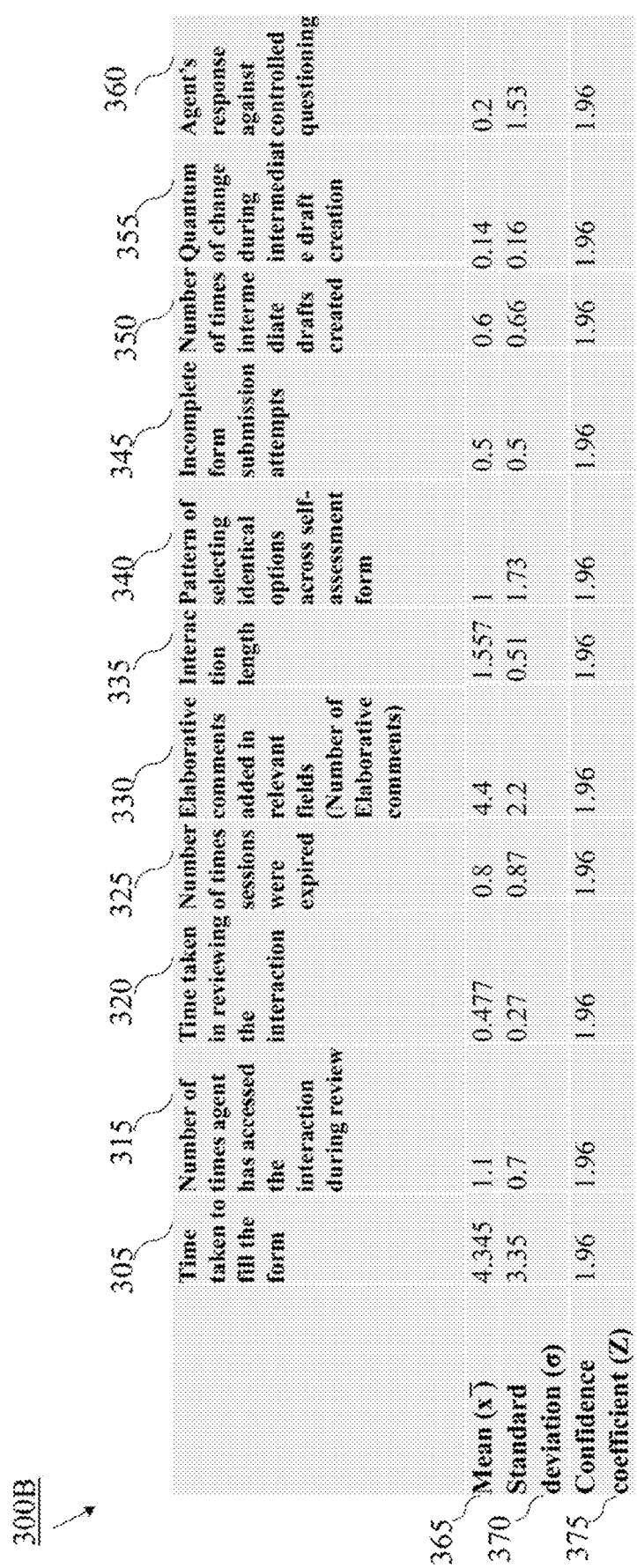

| | 305 | 315 | 320 | 325 | 330 | 335 | 340 | 345 | 350 | 355 | 360 |
|---|---|---|---|---|---|---|---|---|---|---|---|
| | Time taken to fill the form | Number of times agent has accessed the interaction during review | Time taken in reviewing the interaction | Number of times sessions were expired | Elaborative comments added in relevant fields (Number of Elaborative comments) | Interaction length | Pattern of selecting identical options across self-assessment form | Incomplete form submission attempts | Number of intermediate drafts created | Quantum of change during intermediate draft creation | Agent's response against controlled questioning |
| 365 Mean ($\bar{x}$) | 4.345 | 1.1 | 0.477 | 0.8 | 4.4 | 1.557 | 1 | 0.5 | 0.6 | 0.14 | 0.2 |
| 370 Standard deviation (σ) | 3.35 | 0.7 | 0.27 | 0.87 | 2.2 | 0.51 | 1.73 | 0.5 | 0.66 | 0.16 | 1.53 |
| 375 Confidence coefficient (Z) | 1.96 | 1.96 | 1.96 | 1.96 | 1.96 | 1.96 | 1.96 | 1.96 | 1.96 | 1.96 | 1.96 |

Figure 3B

| | Time taken to fill the form (305) | Number of times agent has accessed the interaction during review (315) | Time taken in reviewing the interaction (320) | Number of times sessions were expired (325) | Elaborative comments added in relevant fields (Number of Elaborative comments) (330) | Interaction length (335) | Pattern of selecting identical options across self-assessment form (340) | Incomplete form submission attempts (345) | Number of intermediate drafts created (350) | Quantum of change during intermediate e draft creation (355) | Quantum of Agent's response against controlled questioning (360) |
|---|---|---|---|---|---|---|---|---|---|---|---|
| Upper bound of Confidence interval estimate ($\bar{x} + Z\,\sigma/\sqrt{n}$) (380) | 6.4228 | 1.5341 | 0.6444 | 1.3396 | 5.7645 | 1.8733 | 2.0730 | 0.8101 | 1.0093 | 0.2392 | 1.1489 |
| Lower bound of Confidence interval estimate ($\bar{x} - Z\,\sigma/\sqrt{n}$) (385) | 2.2671 | 0.6658 | 0.3095 | 0.2603 | 3.0354 | 1.2406 | -0.0730 | 0.1898 | 0.1906 | 0.0407 | -0.7489 |

| | Time taken to fill the form (405) | Number of times agent has accessed the interaction during review (415) | Time taken in reviewing the interaction (420) | Number of times sessions were expired (425) | Elaborative comments added in relevant fields (Number of Elaborative comments) (430) | Interaction length (435) | Pattern of selecting identical options across self-assessment form (440) | Incomplete form submission attempts (445) | Number of times of change during intermediate drafts created (450) | Quantum of change during intermediate draft creation (455) | Agent's response against controlled questioning (460) |
|---|---|---|---|---|---|---|---|---|---|---|---|
| Sample Interaction-1 (465) | 4.4 | 1 | 0.55 | 0 | 6 | 1.7 | 1 | 0 | 1 | 0.1 | 1 |
| Sample Interaction-2 (470) | 8 | 3 | 0.5 | 2 | 2 | 1.8 | -1 | 1 | 2 | 0.1 | -2 |
| Divergence for Interaction-1 (475) | 0 | 0 | 0 | 0.2603 | 0.2354 | 0 | 1.0730 | 0.1898 | 0 | 0 | 0 |
| Divergence for Interaction-2 (480) | 1.5771 | 1.4658 | 0 | 0.6603 | 1.0354 | 0 | 0.9269 | 0.1898 | 0.9906 | 0 | 1.2510 |
| SDD for Interaction-1 (485) | 1.7587 | | | | | | | | | | |
| SDD for Interaction-2 (490) | 8.0972 | | | | | | | | | | |

SYSTEM AND METHOD TO GAUGE AGENT SELF-ASSESSMENT EFFECTIVENESS IN A CONTACT CENTER

TECHNICAL FIELD

The present disclosure relates to the field of data analysis to improve agent's performance in a contact center, according to a calculated indicator of an agent's awareness, efforts, and gravity towards the agent's self-assessment.

BACKGROUND

In a contact center, an agent self-assessment is a significant instrument to empower agents to review their own impact and performance. An agent self-assessment may reinforce the understanding and awareness of expectations and may be a way to make the agents become motivated and have them inclined to invest in their career development. Agents self-assessment may be a tool that may provide an opportunity for the agents to: review their customer interactions such as, calls, emails etc. to identify areas for improvement, and to call out shortcomings.

When an agent self-assessment is accomplished through self-scoring, agents may feel less threatened and judged, because they evaluate themselves. Thus, an effective self-assessment by the agents should become a pre-requisite.

Currently, there is no effective mechanism that is available to gauge agent's self-assessment effectiveness, which results in agents not being able to communicate the actual problem areas which are impacting their individual performance and accordingly to take remedial measures promptly and effectively. Also, when there is no effective mechanism to measure agent's self-assessment, agents do not have a clear picture about the quality and effectiveness of their self-assessment and the contact center managers are not able to effectively gauge and communicate the problem areas impacting agent's performance, which eventually may adversely impact on the overall quality of customer interactions.

Moreover, in the absence of effective agent's self-assessment, in the aspect of the agents, their employee-engagement and loyalty may be reduced, and in the aspect of the contact center, the contact center, may get devoid of a medium of agents' self-reflection and agents self-development. Moreover, the contact center might miss an opportunity to demonstrate the employees, that the organization is interested in having open and honest conversations about agents' improvement on their self-assessment and understanding the value it brings.

When agents' self-assessment is performed in a measurable manner of the self-assessment effectiveness, it may assist to make the agents more open and receptive to improvement initiatives. Accordingly, there is a need for a technical solution to gauge effectiveness of agent's self-assessment, as it opens up a world of proactive behavior that has a positive ripple effect for the entire contact center and therefore, agents self-assessment may be one of the most reliable ways to ensure quality customer service.

SUMMARY

There is thus provided, in accordance with some embodiments of the present disclosure, a computerized-method for gauging agent's self-assessment effectiveness, in a contact center.

Furthermore, in accordance with some embodiments of the present disclosure, in a computerized system comprising a processor, a database of self-assessment data and a memory to store the database. The processor may be configured to operate, for each interaction between an agent and a customer: a Self-assessment Consolidation module that may be configured to: (i) consolidate one or more preconfigured data points of a sample of 'n' agents, from one or more systems, into the database of self-assessment data; (ii) for each data point of the one or more preconfigured data points: calculate a confidence interval and storing the confidence interval in the database of self-assessment data. The confidence interval is having an upper-bound and a lower-bound.

Furthermore, in accordance with some embodiments of the present disclosure, the processor may be further configured to operate a Self-assessment Divergence Determinant (SDD) module. As shown below by formula II.

Furthermore, in accordance with some embodiments of the present disclosure, the operating of the SDD module may include: retrieving one or more preconfigured data points of the interaction between the agent and the customer from the database of self-assessment data and for each data point of the retrieved one or more preconfigured data points of the interaction between the agent and the customer: (i) retrieving the confidence interval for each preconfigured data point of the interaction between the agent and the customer from the database of self-assessment data; (ii) setting a divergence indicator as zero, when the data point is within the confidence interval; (iii) setting the divergence indicator as a subtraction of the data point from the calculated lower-bound, when the data point is lower than the lower-bound of the confidence interval; and setting the divergence indicator as a subtraction of the calculated upper-bound from the data point, when the data point is greater than the upper-bound of the confidence interval.

Furthermore, in accordance with some embodiments of the present disclosure, the operating of the SDD may further include accumulating the divergence indicator of the one or more data points to yield an SDD for the interaction and may send the SDD to one or more systems, as an agent's self-assessment effectiveness gauge. The SDD may be presented on a display unit in the one or more systems after it was sent to the one or more systems.

Furthermore, in accordance with some embodiments of the present disclosure, the calculating of the confidence interval may include (i) calculating a mean score of the 'n' agents; (ii) calculating a standard deviation; (iii) determining a confidence coefficient; (iv) calculating a lower-bound of the confidence interval by subtracting from the mean score a multiply of the confidence coefficient by the standard deviation divided by a square root of 'n'; and (v) calculating an upper-bound of the confidence interval by adding to the mean score a multiply of the confidence coefficient by the standard deviation divided by a square root of 'n'.

Furthermore, in accordance with some embodiments of the present disclosure, the confidence interval may be between the calculated lower-bound and the calculated upper-bound.

Furthermore, in accordance with some embodiments of the present disclosure, the one or more preconfigured data points may be selected from at least one of: (i) time taken to fill the form; (ii) a number of times an agent has accessed a recording of the interaction during review of the interaction; (iii) time taken to review the interaction; (iv) number of times sessions were expired; (v) a number of elaborative comments added in relevant fields; (vi) an interaction length;

(vii) a pattern of selecting identical options across self-assessment form; (viii) a number of incomplete form submission attempts; (ix) a number of intermediate drafts created; (x) quantum of change during intermediate draft creation; and (xi) agent's response against controlled questioning.

Furthermore, in accordance with some embodiments of the present disclosure, the one or more systems may be selected from at least one of: (i) supervisor dashboard; (ii) quality management; (iii) workforce optimization and (iv) any other system.

Furthermore, in accordance with some embodiments of the present disclosure, the SDD may be sent to one or more systems for follow-on remedial measures to improve agent's performance and to improve customer experience.

Furthermore, in accordance with some embodiments of the present disclosure, the follow-on remedial measures may be selected from at least one of: (i) manager-agent communication; (ii) coaching packages assignment to agents; (iii) rework self-assessment by agent; and (iv) key inputs to agent performance management.

Furthermore, in accordance with some embodiments of the present disclosure, the accumulating of the divergence indicator of the one or more data points to yield an SDD, for the interaction, may be a weighted accumulation. A preconfigured weight may be associated to each data point.

Furthermore, in accordance with some embodiments of the present disclosure, the one or more preconfigured data points of a sample of 'n' agents, from the one or more systems, may be preprocessed before being consolidated into the database of self-assessment data.

Furthermore, in accordance with some embodiments of the present disclosure, the one or more systems that the one or more data points may be consolidated from, by the Self-assessment Consolidation module, are selected from at least one of: (i) quality management; (ii) Automated Call Distribution (ACD); (iii) Workforce management; and (iv) any other system.

There is further provided, in accordance with some embodiments of the present disclosure, a computerized-system for gauging agent's self-assessment effectiveness, in a contact center.

Furthermore, in accordance with some embodiments of the present disclosure, the computerized-system may include a database of self-assessment; a memory to store the database and a processor.

Furthermore, in accordance with some embodiments of the present disclosure, the processor may be configured to operate, for each interaction between an agent and a customer, a Self-assessment Consolidation module to: (i) consolidate one or more preconfigured data points of a sample of 'n' agents, from one or more systems, into the database of self-assessment data; (ii) for each data point of the one or more preconfigured data points: calculate a confidence interval. The confidence interval is having an upper-bound and a lower-bound.

Furthermore, in accordance with some embodiments of the present disclosure, the processor may be further configured to operate a Self-assessment Divergence Determinant (SDD) module. As shown below by formula II.

Furthermore, in accordance with some embodiments of the present disclosure, the operating of the SDD module may include: receiving one or more preconfigured data points of the interaction between the agent and the customer and for each data point of the received one or more preconfigured data points of the interaction between the agent and the customer: (i) receiving the confidence interval for each preconfigured data point of the interaction between the agent and the customer calculated by the Self-assessment Consolidation module; (ii) setting a divergence indicator as zero, when the data point is within the confidence interval; (iii) setting the divergence indicator as a subtraction of the data point from the calculated lower-bound, when the data point is lower than the lower-bound of the confidence interval; and setting the divergence indicator as a subtraction of the calculated upper-bound from the data point, when the data point is greater than the upper-bound of the confidence interval.

Furthermore, in accordance with some embodiments of the present disclosure, the operating of the SDD may further include accumulating the divergence indicator of the one or more data points to yield an SDD for the interaction and may send the SDD to one or more systems, as an agent's self-assessment effectiveness gauge. The SDD may be presented on a display unit in the one or more systems after it was sent to the one or more systems.

BRIEF DESCRIPTION OF THE DRAWINGS

FIG. 3A illustrates an example data points values which may be collected for each of the data point for a sample of 'n' agents, in accordance with some embodiments of the present disclosure;

FIG. 3B illustrates a calculation of a mean score, standard data deviation and confidence coefficient for each data point shown in FIG. 3A, in accordance with some embodiments of the present disclosure;

FIG. 3C illustrates upper bound and lower bound results for each data point presented in FIG. 3A, in accordance with some embodiments of the present disclosure;

FIG. 4 illustrates data table for two interactions and a divergence indicator for each data point thereof and SDD for each interaction, in accordance with some embodiments of the present disclosure;

DETAILED DESCRIPTION

Figure 1:
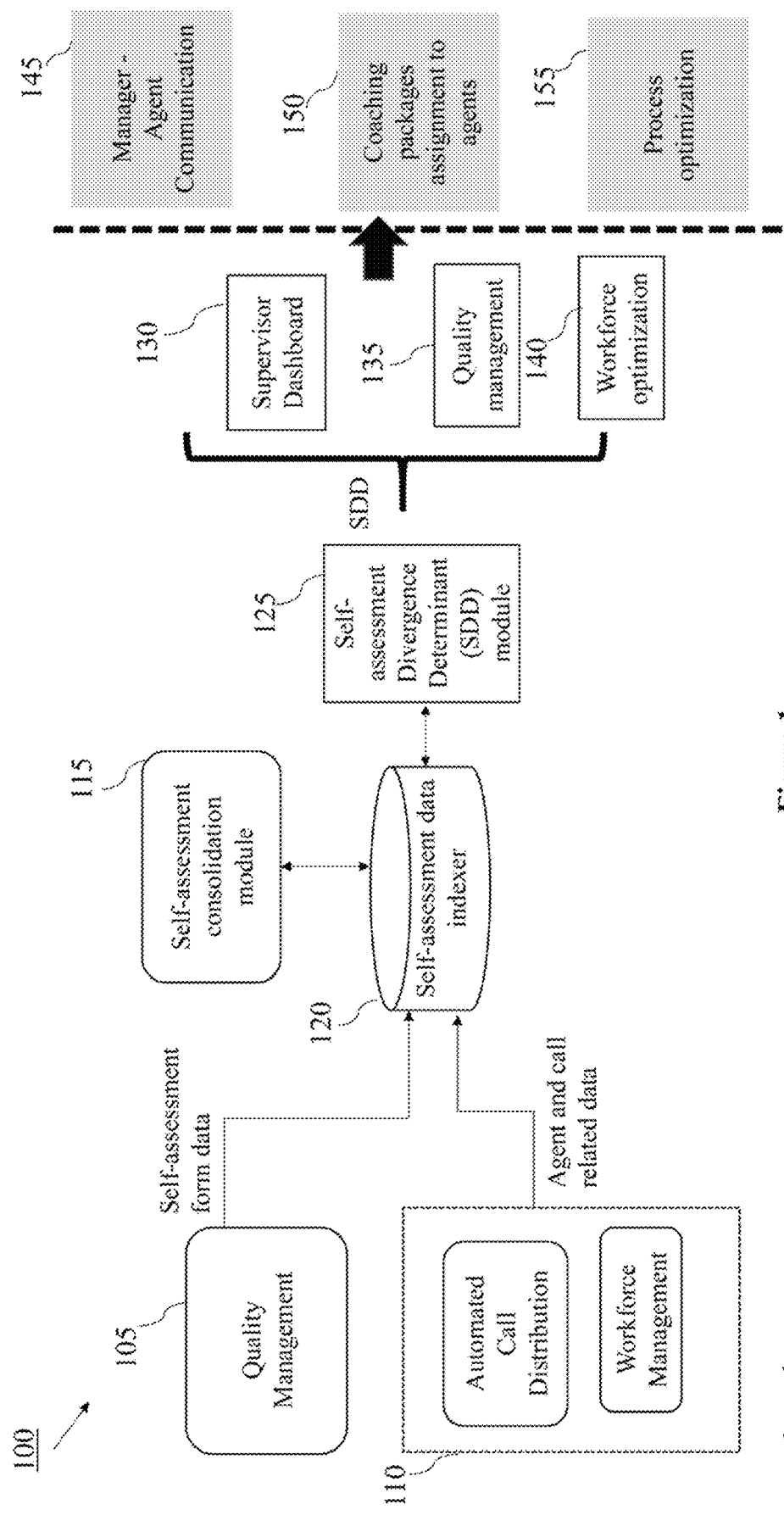
FIG. 1 schematically illustrates a high-level diagram of a computerized system for gauging agents' self-assessment effectiveness indicator, in a contact center, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing terms such as, for example, "processing," "computing," "calculating," "determining,"

"establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The terms "interaction" and "call" are interchangeable.

The term "self-assessment" as used herein, refers to a process in a contact center. During the process an agent reviews the agent's own work by listening to recording and evaluating the agent call scores. This process of that is given to the agent to provide self-feedback allows the agent to take charge of the agent own career and may have long-lasting positive benefits.

The term "effective self-assessment" as used herein refers to a self-assessment that helps a user, such as a supervisor or a manger to understand a reliable and clear picture about the agent's own performance. Upon a measurement of the self-assessment effectiveness relevant training programs may be assigned to the Agent which may benefit both the organization and the employee.

The term "confidence level", as used herein, refers to the percentage of all the possibilities that may include values of the population in a given interval from the mean score.

The term "confidence interval", as used herein, refers to an estimate that is determined from statistics of the data. It is a range of all possible values for a parameter, such as the mean in a given confidence level.

The embodiments taught herein relating to contact interactions in a Contact Center (CC) with contact interactions between a customer and an agent, i.e., a CC representative, is merely shown by way of example and technical clarity, and not by way of limitation of the embodiments of the present disclosure. The embodiments herein for effective coaching by automatically pointing on an influencer on measured performance, e.g., self-assessment, may be applied on any customer service channel, such as, Interactive Voice Response (IVR) or mobile application. Furthermore, the embodiments herein, are not limited to a CC, but may be applied to any suitable platform that is providing customer service channels.

When individuals begin to assess their performances regularly, it is very likely that their self-awareness would improve. When self-assessment is done well, agent self-assessment reinforces understanding and awareness of expectations and enables agents to succeed through self-development and reflection.

Furthermore, self-assessments encourage employees to review and improve their own performance and can create real "aha" moments for the agents. When agents actually listen to themselves interact with the customer, they can better understand where both their evaluators and their customers are coming from with their feedback. Sincere and effective self-assessment is the cornerstone of success for any contact center. When managers and agents can identify areas of improvement and work together through training and coaching, they can find engagement with their customers. Also, effective self-assessment is critical for boosting and maintaining customer engagement and better agent performance.

Customer satisfaction may be increased due to improved customer experience imparted by more empowered, motivated, loyal agents receptive to quality improvement initiatives. Poor customer service may have high costs to businesses.

Current contact center systems don't gauge agents' self-assessment effectiveness. Thus, contact centers are missing an opportunity for agents to realize self-assessment and self-correctness. Accordingly, there is a need for a technical solution to provide contact centers with a clear indication of agents' effectiveness of self-assessment, which may reflect agent's awareness, efforts, and gravity towards the agents' self-assessment, by gauging agents' self-assessment effectiveness, in the contact center.

According to some embodiments of the present disclosure, gauging agents' self-assessment effectiveness, in the contact center may be performed by operating a computerized-method for gauging agent's self-assessment effectiveness, which may derive 'Self-assessment divergence determinant (SDD)'. Thus, helping agents to improve on their self-assessment capabilities leading to more productive coaching sessions, which in turn may contribute to higher-quality customer service and eventually increased customer satisfaction.

FIG. 1 schematically illustrates a high-level diagram of a computerized system 100 for gauging agents' self-assessment effectiveness indicator, in a contact center, in accordance with some embodiments of the present disclosure.

Figure 2A:
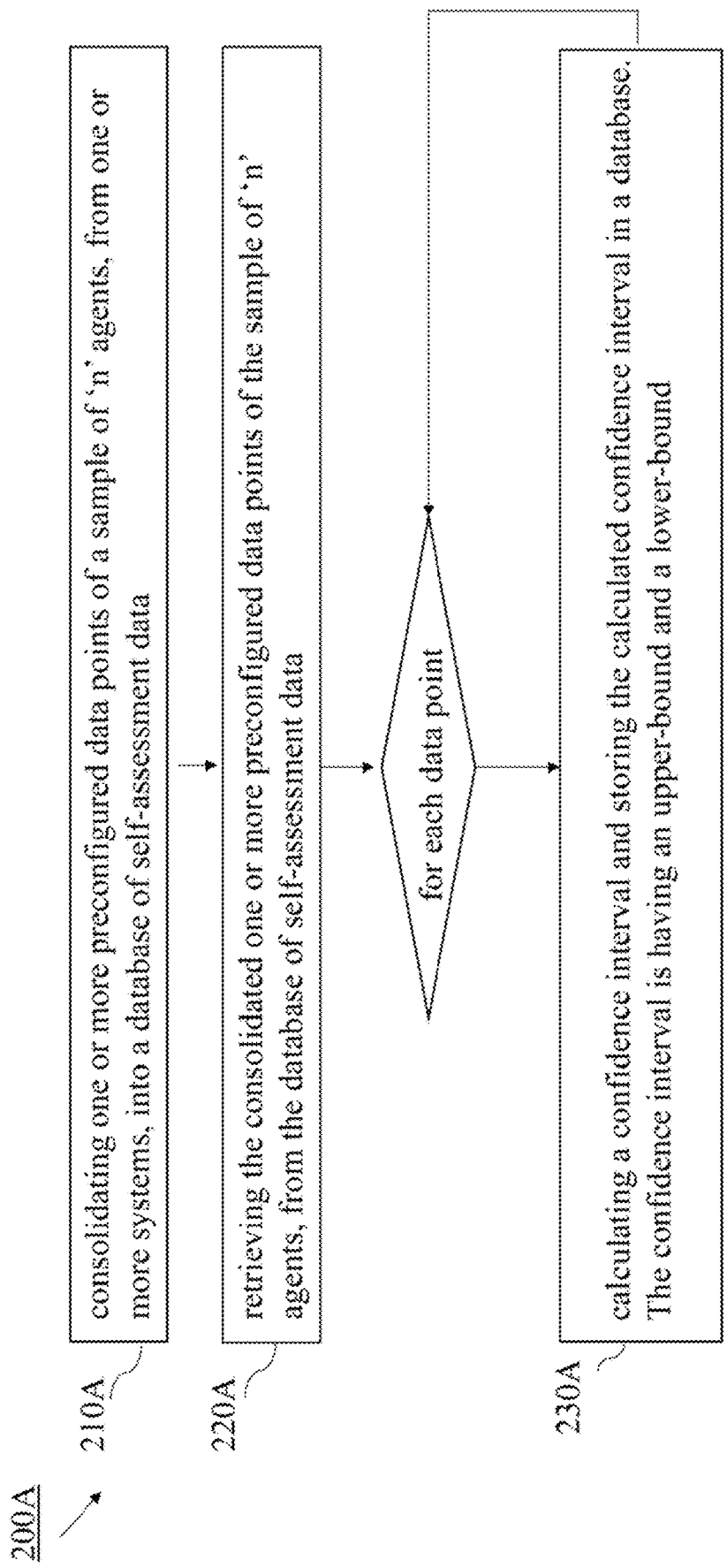
FIG. 2A is a high-level workflow of Self-assessment Consolidation module, in accordance with some embodiments of the present disclosure.
Figure 5:
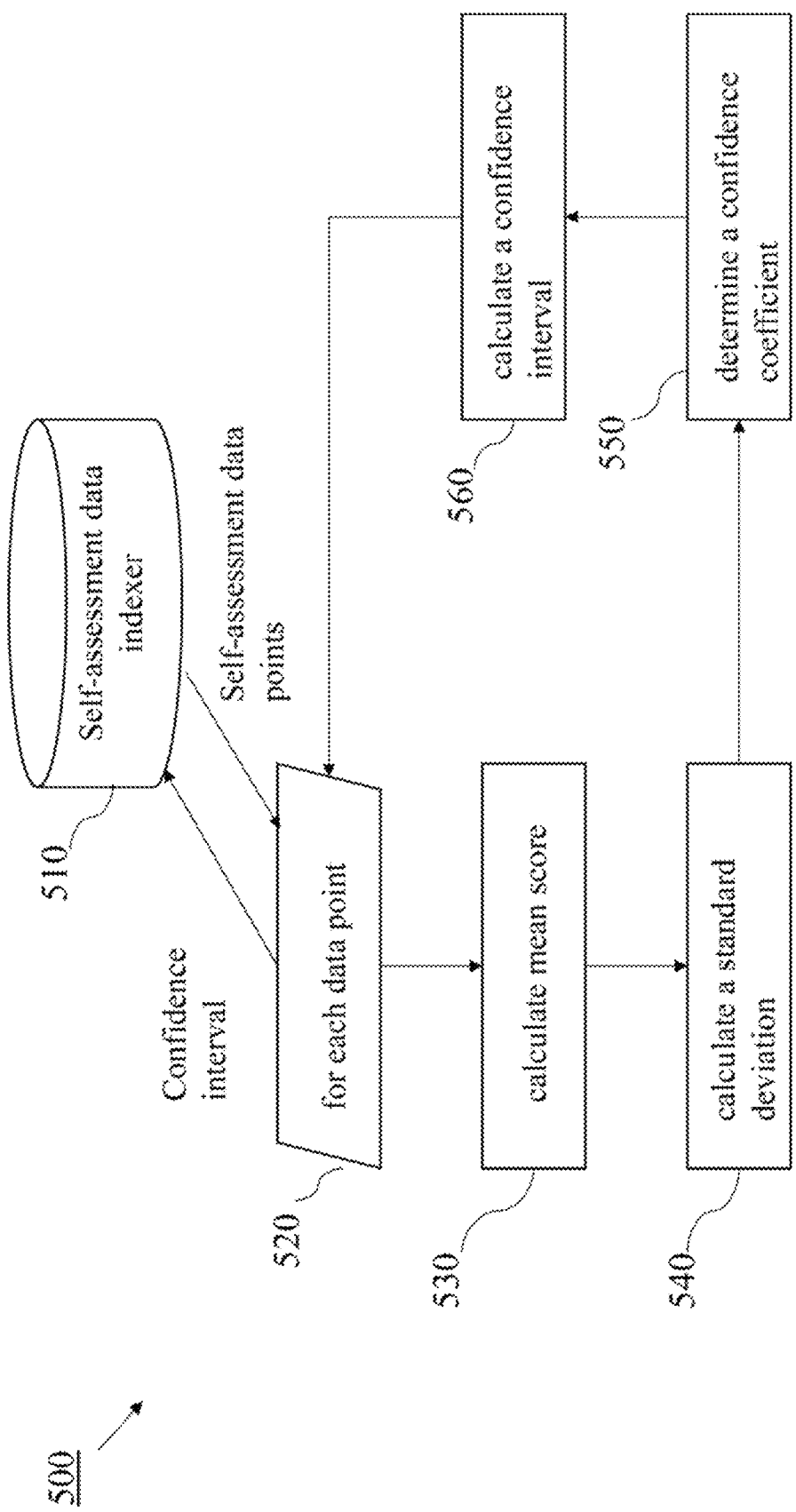
FIG. 5 is a flowchart diagram of a computerized method to calculate a confidence interval, in accordance with some embodiments of the present disclosure.

According to some embodiments of the present disclosure, the computerized system 100 for gauging agents' self-assessment effectiveness indicator may operate a self-assessment consolidation module 115, such as self-assessment consolidation module 200A in FIG. 2A and self-assessment consolidation module 500 in FIG. 5.

According to some embodiments of the present disclosure, the Self-assessment Consolidation module 115 may be operated to: (i) consolidate one or more preconfigured data points of a sample of 'n' agents, from one or more systems, into the database of self-assessment data; (ii) retrieve the consolidated one or more preconfigured data points of the sample of 'n' agents, from the database of self-assessment data; and (iii) for each data point of the one or more preconfigured data points: calculating a confidence interval. The confidence interval is having an upper-bound and a lower-bound.

According to some embodiments of the present disclosure, the data points from input data sources, i.e., one or more systems, such as Quality Management (QM) system 105 or any other input data sources, such as Automated Call Distribution (ACD) and Workforce management systems 110, may be stored in a database, such as, a self-assessment data indexer 120.

According to some embodiments of the present disclosure, the one or more preconfigured data points, may be data points of a sample of 'n' agents, from the one or more systems, which may be preprocessed before being consolidated into a database, such as the self-assessment data indexer 120.

According to some embodiments of the present disclosure, the input data from the QM 105 may be a self-assessment form data which may be filled by an agent after each interaction with a customer. While the agent is completing the self-assessment form-filling, the agent may have an opportunity to listen to a recording of the interaction or to review a written format of the interaction.

According to some embodiments of the present disclosure, the input data sources, may be comprised of preconfigured data points, which may be directly or indirectly related to the effectiveness of self-assessment. The data points may be selected from at least one of: (i) time taken to fill the self-assessment form; (ii) a number of times an agent has accessed a recording of the interaction during review of the interaction; (iii) time taken to review the interaction; (iv) number of times sessions were expired; (v) a number of elaborative comments added in relevant fields; (vi) an interaction length; (vii) a pattern of selecting identical options across a self-assessment form; (viii) a number of incomplete form submission attempts; (ix) a number of intermediate drafts created; (x) quantum of change during intermediate draft creation; and (xi) agent's response against controlled questioning.

According to some embodiments of the present disclosure, a data point such as, the time taken to fill the form and the time taken to review the interaction may influence the effectiveness of the self-assessment, because a short time may indicate that the agent didn't invest enough time for an effective self-assessment. A data point such as, the number of times that the agent has accessed a recording of the interaction during the review of the interaction and the number of elaborative comments added in relevant fields may influence the effectiveness of the self-assessment because a specified number of times might mean that the agent has invested enough efforts to yield an effective self-assessment.

According to some embodiments of the present disclosure, a data point such as, the number of times sessions were expired refers to a user's session while filling the Self-assessment form. The sessions typically expire, because of the inactivity, and this is an indication that the agent is working on many activities in parallel and not paying enough attention to the filling of the self-assessment form.

According to some embodiments of the present disclosure, a data point such as, the interaction length may be related to other data points, such as the time taken to fill the form, the number of times an agent has accessed a recording of the interaction during review of the interaction and the time taken to review the interaction. A specified number of intermediate drafts created of the self-assessment form, may indicate that the agent is taking the form-filling seriously which may result in effective self-assessment, when the quantum of change during each intermediate draft creation is high.

According to some embodiments of the present disclosure, agent's response against controlled questioning means asking the same question in a different way, in the self-assessment form. Sometimes controlled questioning is added to a self-assessment form in order to check the seriousness of agents when they fill the self-assessment form. A similar answer to the same question in a different way, may have a score such as '+1' and a difference in the response to the same question in a different way, may have a score such as '−1', then all the scores may be accumulated.

According to some embodiments of the present disclosure, a data point, such as, the pattern of selecting identical options to questions, across the self-assessment form, may indicate that the agent didn't put the necessary amount of effort in completing the self-assessment form, hence the self-assessment might have lower level of effectiveness. It may be calculated as follows: a similar answer in the successive options may have a score, such as '+1' and a difference in the response in the successive options may have a score, such as '−1'. Then, all the scores of the responses may be accumulated to quantify "pattern of selecting identical options across self-assessment form".

According to some embodiments of the present disclosure, the number of incomplete form submission attempts may have a negative effect on the effectiveness of the self-assessment.

According to some embodiments of the present disclosure, since the data may be consolidated by multiple applications and in an asynchronously manner, the one or more preconfigured data points of a sample of 'n' agents, may be preprocessed by a streaming middleware, such as Amazon Kinesis Data Stream (KDS) (not shown). The Amazon KDS is a service that is used to collect and process large streams of data records in real-time.

According to some embodiments of the present disclosure, a Self-assessment Divergence Determinant (SDD) module, such as SDD module 125, may be operated. The SSD module 125, such as SDD module 200B in FIG. 2B, and such as SDD module 600 in FIG. 6, may retrieve data points of an interaction and a confidence interval thereof which may be calculated by self-assessment consolidation module 115, from a database, such as self-assessment data indexer 120, to set an indicator of agent's self-assessment divergence, per each interaction between an agent and a customer.

According to some embodiments of the present disclosure, Self-assessment consolidation module 115, such as Self-assessment consolidation module 200A in FIG. 2A and such as Self-assessment consolidation module 500, in FIG. 5, may calculate a confidence interval, based on a mean score, a standard deviation and a determined confidence coefficient, according to formula I, as follows:

$$\mu = \bar{x} \pm Z \frac{\sigma}{\sqrt{n}}$$

Figure 2B:
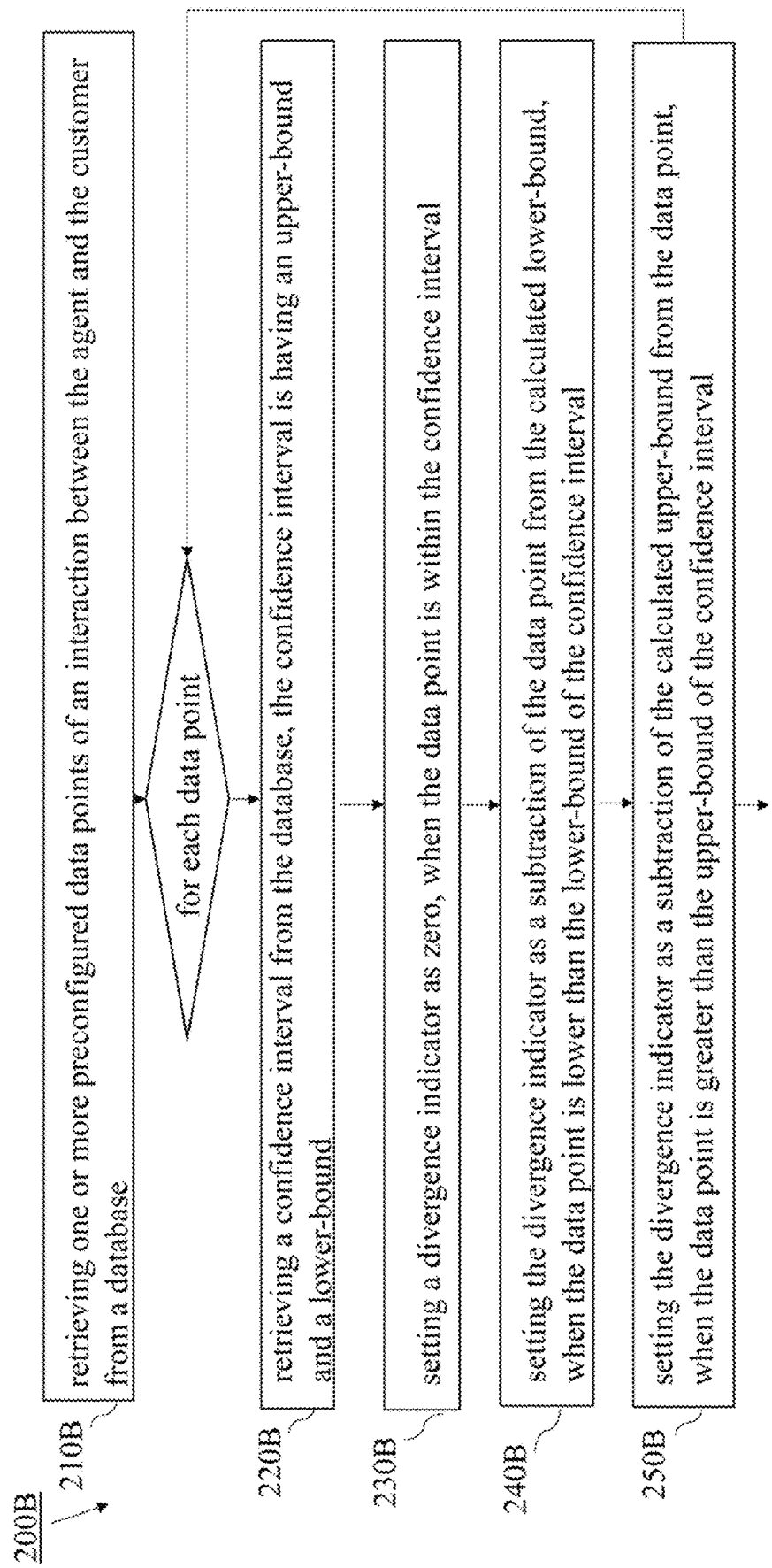
FIGS. 2B-2C are a high-level workflow of a Self-assessment Divergence Determinant (SDD) module, in accordance with some embodiments of the present disclosure.
Figure 6:
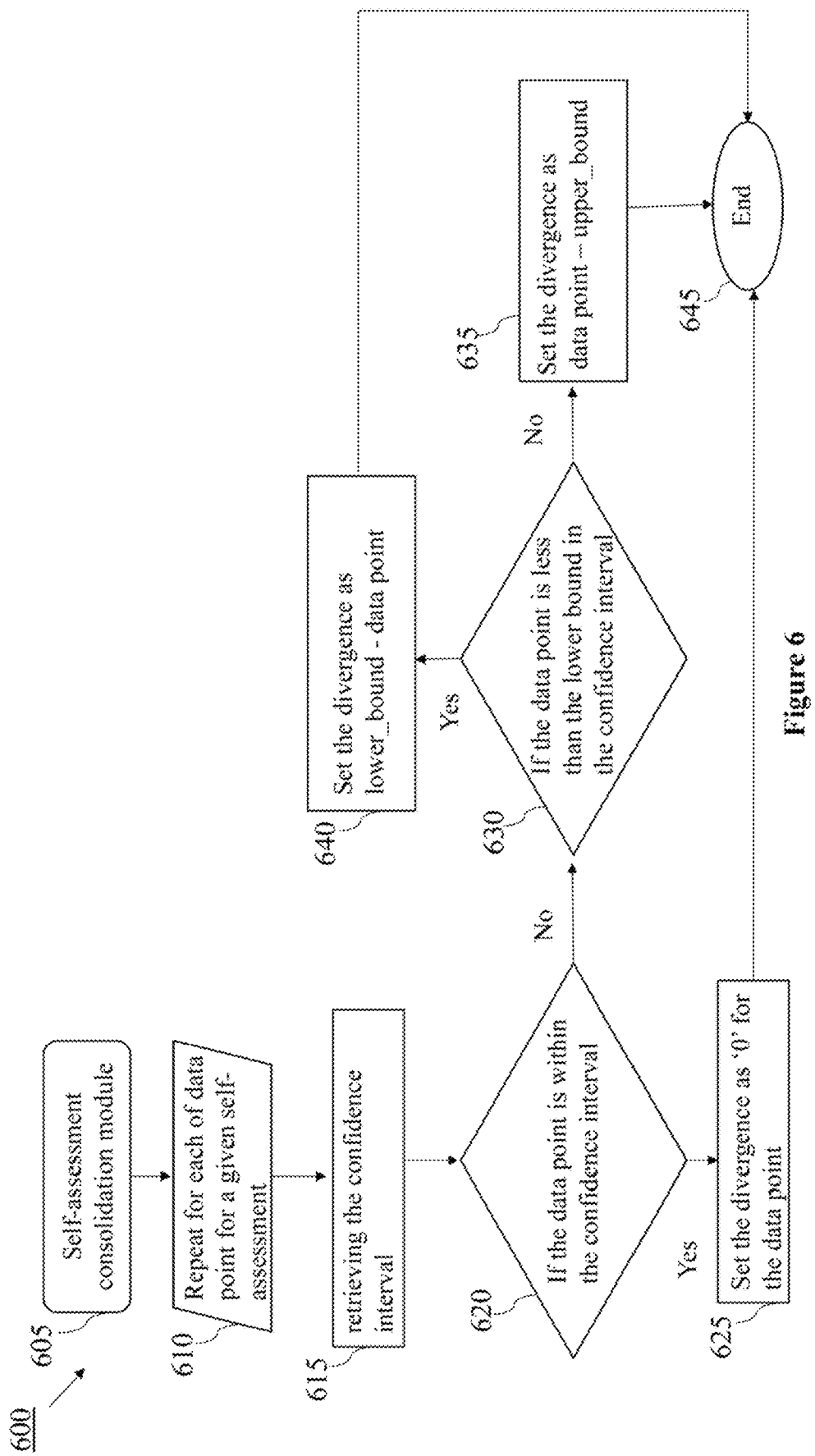
FIG. 6 a high-level flowchart diagram of Self-assessment Divergence Determinant (SDD) module, in accordance with some embodiments of the present disclosure.

Whereby:
µ is a confidence interval
x⁻ is a mean score
Z is a confidence coefficient
σ is a standard deviation
n is a sample size According to some embodiments of the present disclosure, the SDD module 125, such as SDD module 200B on FIG. 2B and SDD module 600 in FIG. 6, may receive the confidence interval calculated by Self-assessment consolidation module 115, such as Self-assessment consolidation module 500, in FIG. 5 and such as Self-assessment consolidation module 200A, in FIG. 2A, according to formula I by: (i) calculating a mean score of a sample of 'n' agents; (ii) calculating a standard deviation; and (iii) determining a confidence coefficient.

According to some embodiments of the present disclosure, a lower-bound of the confidence interval may be calculated, by the Self-assessment consolidation module 115, such as Self-assessment consolidation module 500, in FIG. 5, and such as Self-assessment consolidation module 200A, in FIG. 2A may be operated, by subtracting from the mean score a multiply of the confidence coefficient by the standard deviation divided by a square root of 'n'.

According to some embodiments of the present disclosure, an upper-bound of the confidence interval may be calculated, by the Self-assessment consolidation module 115, such as Self-assessment consolidation module 500, in FIG. 5 and such as Self-assessment consolidation module 200A, in FIG. 2A, by adding to the mean score a multiply of the confidence coefficient by the standard deviation divided by a square root of 'n'. The confidence interval may be an interval between the calculated lower-bound and the calculated upper-bound.

According to some embodiments of the present disclosure, the SDD module 125, such as SDD module 200B in FIG. 2B and SDD module such as SDD module 600 in FIG. 6 may receive one or more preconfigured data points of the interaction between the agent and the customer and for each data point of the received one or more preconfigured data points of the interaction between the agent and the customer receiving the confidence interval for each preconfigured data point from a database, such as self-assessment data indexer 120 which was calculated by Self-assessment Consolidation module 115, such as Self-assessment consolidation module 500, in FIG. 5 and such as Self-assessment consolidation module 200A, in FIG. 2A.

According to some embodiments of the present disclosure, the SDD module 125, such as SDD module 200B in FIG. 2B and SDD module such as SDD module 600 in FIG. 6 may set a divergence indicator as zero, when the data point is within the confidence interval, set the divergence indicator as a subtraction of the data point from the calculated lower-bound, when the data point is lower than the lower-bound of the confidence interval; and set the divergence indicator as a subtraction of the calculated upper-bound from the data point, when the data point is greater than the upper-bound of the confidence interval.

According to some embodiments of the present disclosure, the SDD module 125, such as SDD module 200B in FIG. 2B and SDD module such as SDD module 600 in FIG. 6 may accumulate the divergence indicator of the one or more data points, to yield an SDD for the interaction. The SDD module 125, such as SDD module 200B in FIG. 2B and SDD module such as SDD module 600 in FIG. 6 may send the SDD to one or more systems, as an agent's self-assessment effectiveness gauge, for follow-on remedial measures to improve agent's performance and to improve customer experience.

According to some embodiments of the present disclosure, the SDD may be sent to one or more system and may be represented on a display unit.

According to some embodiments of the present disclosure, the SDD may be calculated according to formula II, as follows:

$$SDD = \sum_{1}^{n} \left\{ \begin{array}{l} \text{Let } k = \begin{cases} 0 & \text{for(lower\_bound} \leq x \leq \text{upper\_bound)} \\ 1 & \text{Otherwise} \end{cases} \\ \begin{cases} 0 \text{ for } k == 0 \\ w * \begin{cases} (\text{lower\_bound} - x) \text{ for } (x < \text{lower\_bound}) \\ (x - \text{upper\_bound}) \text{ for } (x > \text{lower\_bound}) \end{cases} \bigg| \text{ Otherwise} \end{cases} \end{array} \right\}$$

Whereby:
x is a datapoint
k is a temporary variable
n is a number of data points
lower_bound and upper_bound are minima and maxima of confidence interval estimate
w is a weight (e.g., value is configured to be '1').

According to some embodiments of the present disclosure, the one or more systems that may receive the SDD may be supervisor dashboard 130 or quality management system 135 or workforce optimization system 140 or any other system (not shown).

According to some embodiments of the present disclosure, the follow-on remedial measures may be selected from at least one of: (i) manager-agent communication 145; (ii) coaching packages assignment to agents 150; (iii) rework self-assessment by agent (not shown); and (iv) process optimization 155, such as key inputs to agent performance management.

FIG. 2A is a high-level workflow of Self-assessment Consolidation module 200A, in accordance with some embodiments of the present disclosure.

According to some embodiments of the present disclosure, operation 210A may comprise retrieving one or more preconfigured data points of a sample of 'n' agents, from a database of self-assessment data, such as self-assessment data indexer 120, in FIG. 1.

According to some embodiments of the present disclosure, operation 220A may comprise retrieving the consolidated one or more preconfigured data points of the sample of 'n' agents, from the database of self-assessment data, such as self-assessment data indexer 120, in FIG. 1.

According to some embodiments of the present disclosure, operation 230A may be operated iteratively for each data point retrieved from input data sources, such as QM 105 in FIG. 1, ACD and WFM 110 in FIG. 1 and e.g., data points 305-360 in FIG. 3A. Furthermore, operation 230A may comprise for each data point of the one or more preconfigured data points, calculating a confidence interval and storing the calculated confidence interval in a database, such as self-assessment data indexer 120 in FIG. 1. The confidence interval is having an upper-bound and a lower-bound, such as e.g., upper-bound 380 and lower-bound 385 in FIG. 3. The confidence interval may be calculated according to formula I, as mentioned above.

FIG. 2B is a high-level workflow of a Self-assessment Divergence Determinant (SDD) module 200B, in accordance with some embodiments of the present disclosure.

According to some embodiments of the present disclosure, operation 210B may comprise retrieving one or more preconfigured data points of an interaction between the agent and the customer from a database, such as self-assessment data indexer 120 in FIG. 1.

According to some embodiments of the present disclosure, operating iteratively operations 220B-250B for each data point of the retrieved one or more preconfigured data points of the interaction between the agent and the customer.

According to some embodiments of the present disclosure, operation 220B may comprise retrieving the calculated confidence interval from a database, such as self-assessment data indexer 120 in FIG. 1. The confidence interval is having an upper-bound and a lower-bound. The confidence interval may be calculated according to formula I, as mentioned above and for example, according to a Self-assessment Consolidation module 200A in FIG. 2A and such as Self-assessment Consolidation module 500 in FIG. 5.

According to some embodiments of the present disclosure, operation 230B may comprise setting a divergence indicator as zero, when the data point is within the confidence interval According to some embodiments of the present disclosure, operation 240B may comprise setting the divergence indicator as a subtraction of the data point from the calculated lower-bound, when the data point is lower than the lower-bound of the confidence interval.

According to some embodiments of the present disclosure, operation 250B may comprise setting the divergence indicator as a subtraction of the calculated upper-bound from the data point, when the data point is greater than the upper-bound of the confidence interval.

According to some embodiments of the present disclosure, after operating operations 220B-250B for all the one or more preconfigured data points of 'n' agents, operation 260B may comprise accumulating the divergence indicator of the one or more data points to yield an SDD for the interaction. The accumulating of the divergence indicator of the one or more data points to yield an SDD for the interaction may be a weighted accumulation for which a preconfigured weight may be associated to each data point.

According to some embodiments of the present disclosure, operation 270 may comprise sending the SDD to one or more systems, as an agent's self-assessment effectiveness gauge. The one or more systems may be selected from at least one of: (i) supervisor dashboard, such as supervisor dashboard 130 in FIG. 1; (ii) quality management, such as quality management 135 in FIG. 1; (iii) workforce optimization, such as workforce optimization 140 in FIG. 1 and (iv) any other system. The SDD may be sent to one or more systems for follow-on remedial measures to improve agent's performance and to improve customer experience.

According to some embodiments of the present disclosure, after the SDD is sent to the one or more systems, it may be displayed on a display unit in the one or more systems.

According to some embodiments of the present disclosure, the follow-on remedial measures may be selected from at least one of: (i) manager-agent communication, such as manager-agent communication 145 in FIG. 1; (ii) coaching packages assignment to agents, such as coaching packages assignment to agents 150; (iii) rework self-assessment by agent; and (iv) process optimization, such as process optimization 155 in FIG. 1, e.g., key inputs to agent performance management.

FIG. 3A illustrates an example 300A of values which may be collected for each of the data points for a sample of 'n' agents, in accordance with some embodiments of the present disclosure.

Figure 2C:
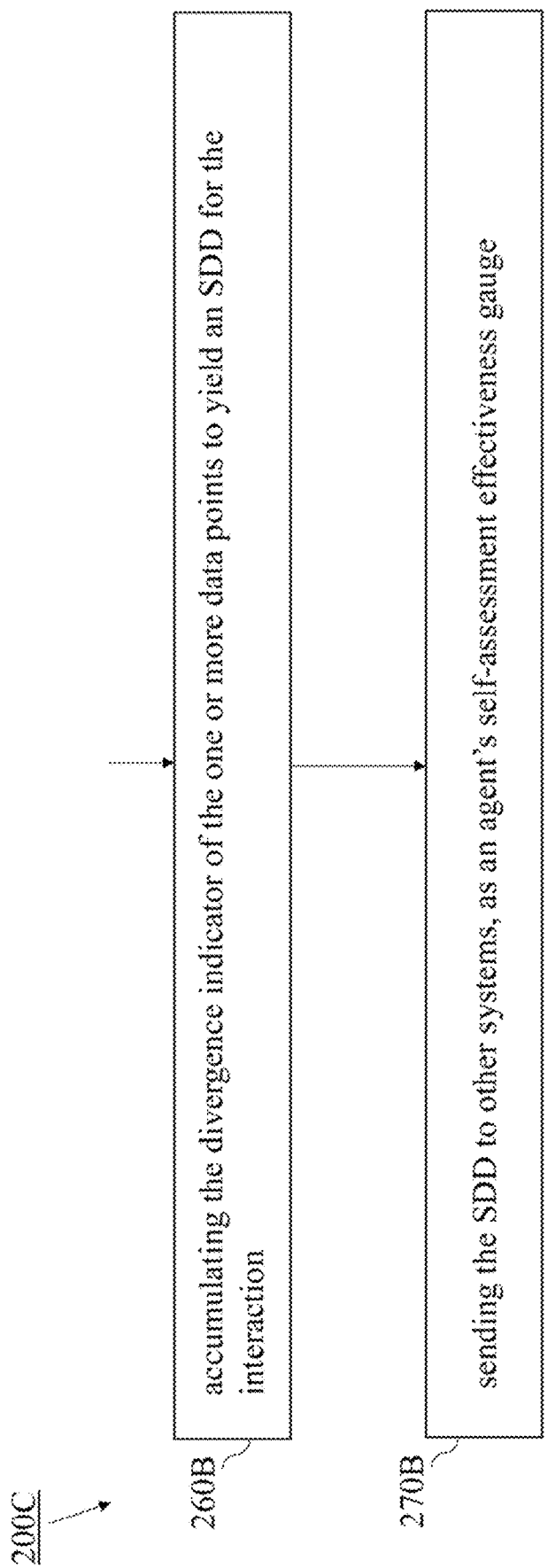

According to some embodiments of the present disclosure, the sample of 'n' agents equals '10' in the example 300A, e.g., agent-1 through agent-10. The data in example 300A may be used to calculate a confidence interval having lower bound and upper bound, as shown in FIG. 3C, by self-assessment consolidation module, such as self-assessment consolidation module 200A in FIG. 2 and such as self-assessment consolidation module 500 in FIG. 5. The calculation may be based on calculated mean 365, standard deviation 370 and determined coefficient 375, as shown in FIG. 3B.

According to some embodiments of the present disclosure, data point, such as the time taken to fill the form 305, may be for example, 3 minutes for agent-1 and 13.33 minutes for agent-9. A data point, such as the number of times the agent has accessed the interaction during review 315, may be for example, once for agent-1, agent-3, agent-5, agent-7 and agent-10 and twice for agent-4, agent-6 and agent-8.

According to some embodiments of the present disclosure, a data point, such as the time taken in reviewing the interaction 320, may be for example, recording was played for 0.5 minute for agent-1 and agent-10 or not played at all i.e., zero minutes, such as agent-2 and agent-9.

According to some embodiments of the present disclosure, the number of times that sessions were expired 325, may be for example, zero times, such as for agent-1, agent-2, agent-5 and agent-6, or once for agent-3, agent-4, agent-7, agent-8 and agent-10.

According to some embodiments of the present disclosure, the number of elaborative comments added in relevant fields 330, may be for example, '5' elaborative comments for agent-1, agent-4, and agent-7, and '4' elaborative comments for agent-3, agent-6 and agent-8.

According to some embodiments of the present disclosure, the interaction length 335, may be for example, 2 minutes for agent-1 and agent-6, but agent-1 has spent '3' minutes to fill the form and agent-6 spent 6.67 minutes to fill the form, as shown in element 305 for agent-1 and agent-6.

According to some embodiments of the present disclosure, the pattern of selecting identical options across self-assessment form 340, may be equal for example, zero for agent-1 and '4' for agent-2. It means that agent-2 has selected more identical options than agent-1 and therefore may be less serious as to filling the self-assessment form which may negatively affect the effectiveness of the self-assessment.

According to some embodiments of the present disclosure, incomplete form submission attempts 345, may be an indication of agent's lack of interest towards the agent's self-assessment for each agent per interaction.

According to some embodiments of the present disclosure, the number of times intermediate drafts were created 350, may be an indication of agent's sincerity and seriousness while providing one's self assessment, when the agent is creating intermediate drafts.

According to some embodiments of the present disclosure, the quantum of change during intermediate draft creation 355 may be the average difference in the answers between the drafts According to some embodiments of the present disclosure, agent's response against controlled questioning 360 may be calculated by having a similar answer scored as +1 and a difference in the response may be scored as −1, then all the scores of the responses may be accumulated.

According to some embodiments of the present disclosure, the data points which were selected to evaluate the effectiveness of self-assessment have a direct co-relation to seriousness, sincerity, focus to details and commitment showcased by the agent to complete the self-assessment form. Agent's lack of motivation and interest in completing the self-assessment can also be identified using the selected data points.

FIG. 3B illustrates a calculation of a mean score, standard data deviation and confidence coefficient 300B for each data point presented in FIG. 3A, in accordance with some embodiments of the present disclosure.

According to some embodiments of the present disclosure, the mean score 365 may be calculated for each data point 305-360 in FIG. 3A, for 10 agents, i.e., when 'n'=10. For example, for a data point the time taken to fill the form 305, 4.345 minutes, for a data point the number of times agent has accessed the interaction during review 315, 1.1 times, for time taken in reviewing the interaction 320, 0.477 minutes and so on for the rest of the data points 325-360.

According to some embodiments of the present disclosure, the standard deviation 370 may be calculated for each data point 305-360. The confidence coefficient (z) may be determined to be for example, 1.960 according to confidence 95%. For example, for confidence 90%, the confidence coefficient (z) may be 1.645. For confidence 99%, the confidence coefficient (z) may be 2.576.

According to some embodiments of the present disclosure, based on the mean score 365, the standard deviation 370 and the confidence coefficient 375, a confidence interval may be calculated for each data point 305-360, according to formula I, and according to self-assessment consolidation module 200A and as shown in diagram 500 in FIG. 5. The confidence interval may have an upper-bound 380 and a lower-bound 385, as shown in FIG. 3C which illustrates upper bound and lower bound results for each data point presented in FIG. 3A, 305-360, in accordance with some embodiments of the present disclosure.

According to some embodiments of the present disclosure, for each data point 305-360, a divergence indicator may be set as zero, when the data point is within the confidence interval.

According to some embodiments of the present disclosure, for each data point 305-360, a divergence indicator may be set as a subtraction of the data point from the calculated lower-bound, when the data point is lower than the lower-bound of the confidence interval.

According to some embodiments of the present disclosure, for each data point 305-360, a divergence indicator may be set as a subtraction of the calculated upper-bound from the data point, when the data point is greater than the upper-bound of the confidence interval.

FIG. 4 illustrates data table 400 for two interactions and a divergence indicator for each data point thereof and SDD for each interaction, in accordance with some embodiments of the present disclosure.

According to some embodiments of the present disclosure, data points 405-460 may be retrieved from a database, such as self-assessment data indexer 120 in FIG. 1, for sample interaction-1 465 and sample interaction-2 470.

According to some embodiments of the present disclosure, for each data point 405-460 the divergence indicator may be set for sample interaction-1 475 and for sample interaction-2 480, according to the calculated confidence interval, that is having an upper-bound 380 and a lower-bound 385, as shown in FIG. 3C.

According to some embodiments of the present disclosure, the divergence for interaction-1 475 and the divergence for interaction-2 may be determined by implementing Self-assessment Divergence Determinant (SDD) module, such as SDD module 200B in FIG. 2B, and such as SDD module 600 in FIG. 6, by setting a divergence indicator as zero, when the data point is within the confidence interval; setting the divergence indicator as a subtraction of the calculated lower-bound from the data point, when the data point is lower than the lower-bound of the confidence interval, as confidence interval lower bound 385 in FIG. 3; and setting the divergence indicator as a subtraction of the calculated upper-bound from the data point, when the data point is greater than the upper-bound of the confidence interval, as confidence interval upper bound 380 in FIG. 3.

According to some embodiments of the present disclosure, the divergence indicator of each data point such as data points 405-460, may be accumulated to yield an SDD for each interaction, e.g., SSD for interaction-1 485 and SSD for interaction-2 490.

According to some embodiments of the present disclosure, the SDD, such as SDD for interaction-1 485 and SDD for interaction-2 490, may be sent to one or more systems, as an agent's self-assessment effectiveness gauge. The value of the SDD for interaction-1 485 '1.7587' may indicate, based on a preconfigured threshold a satisfactory self-assessment by the agent and for example, effective feedback may be communicated to the agent as well as relevant coaching packages may be assigned to the agent.

According to some embodiments of the present disclosure, the value of the SDD for interaction-2 490 '8.0972' may indicate, based on the preconfigured threshold, that the agent self-assessment needs improvement and for example, manager-agent communication may be reinitiated, rework of the self-assessment by the agent may be initiated and a coaching package for effective self-assessment may be assigned to the agent. The SDD may be sent to one or more systems and may be represented on a display unit in the one or more systems.

According to some embodiments of the present disclosure, when the SDD for an interaction is set to zero it may indicate that the self-assessment is effective and that the agent does not need improvement for effective self-assessment.

FIG. 5 is a flowchart diagram 500 of a computerized method to calculate a confidence interval, in accordance with some embodiments of the present disclosure.

According to some embodiments of the present disclosure, for each data point 520 of the one or more preconfigured data points such as data points 305-360 in FIGS. 3A-3C of a sample of 'n' agents, such as agent-1 through agent-10 in FIG. 3A, that has been consolidated from one or more systems, such as QM 105 in FIG. 1 and any other input data sources, such as Automated Call Distribution (ACD) system and Workforce management system 110 in FIG. 1, into the database of self-assessment data indexer 510, such as self-assessment data indexer 120 in FIG. 1, calculating mean score 530 and then calculating a standard deviation and determining a confidence coefficient 550 and accordingly calculating a confidence interval 560, by formula I, as mentioned above.

FIG. 6 a high-level flowchart diagram of Self-assessment Divergence Determinant (SDD) module 600, in accordance with some embodiments of the present disclosure.

According to some embodiments of the present disclosure, operating self-assessment consolidation module 605, such as self-assessment consolidation module 115, in FIG. 1, and such as self-assessment consolidation module 200A, in FIG. 2A, to calculate a confidence interval for the one or more preconfigured data points of a sample of 'n' agents.

According to some embodiments of the present disclosure, repeating for each data point, for a given self-assessment 610, such as data points 305-360 in FIG. 3A, operations 615 through 645.

According to some embodiments of the present disclosure, retrieving a confidence interval 615 and if the data point is within the confidence interval 620 then, setting the divergence as zero for the data point. If the data point is not within the confidence interval and if the data point is less than the lower bound of the confidence interval 630 then, setting the divergence as a subtraction of the data point from the calculated lower-bound 640 and reaching the end of the flowchart 645. The lower-bound may be for example, element 385 for data points 305-360 in FIG. 3C.

According to some embodiments of the present disclosure, if the data point is not within the confidence interval and it is not less than the lower bound of the confidence interval 630 then, setting the divergence as a subtraction of the calculated upper-bound from the data point 635 and reaching the end of the flowchart 645. The upper-bound may be for example, element 380 for data points 305-360 in FIG. 3C.

According to some embodiments of the present disclosure, the calculating of confidence interval 615 may be performed by formula I, according to self-assessment consolidation module 200A and as illustrated in flowchart diagram 500 in FIG. 5 of a computerized method to calculate a confidence interval.

According to some embodiments of the present disclosure, the set divergence may be sent to one or more systems and may be represented on a display unit.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus, certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for gauging agent's self-assessment effectiveness, in a contact center, the computerized-method comprising:

in a computerized system comprising one or more processors, one or more computer memory storing a database of self-assessment data and a set of program modules executable by the one or more processors; for each interaction between an agent and a customer, the one or more processors performs steps including:

(i) operating a Self-assessment Consolidation module, said operating of Self-assessment Consolidation module comprising:

monitoring, via one or more systems, interactions between an agent and a customer and agent actions associated with execution of a form-based self-assessment process executed after each interaction to generate for each interaction one or more preconfigured data points descriptive of the interaction, the one or more systems including at least one agent computer, at least one Automated Call Distribution (ACD) system, and at least one Interactive Voice Response (IVR) system;

consolidating the one or more preconfigured data points of a sample of 'n' agents, from the one or more systems, into the database of self-assessment data;

retrieving the consolidated one or more preconfigured data points of the sample of 'n' agents, from the database of self-assessment data; and for each data point of the one or more retrieved preconfigured data points:

calculating a confidence interval, wherein said confidence interval including an upper-bound and a lower-bound of the confidence interval;

and storing the confidence interval in the database of self-assessment data;

(ii) operating a Self-assessment Divergence Determinant (SDD) module, said operating of the SDD module comprising:

retrieving one or more preconfigured data points of an interaction between the agent and the customer from the database of self-assessment data;

for each data point of the retrieved one or more preconfigured data points of the interaction between the agent and the customer:

retrieving the calculated confidence interval for each preconfigured data point from the database of self-assessment data;

setting a divergence indicator as zero, when the data point is within the confidence interval;

setting the divergence indicator as a subtraction of the data point from the calculated lower-bound, when the data point is lower than the lower-bound of the confidence interval; and setting the divergence indicator as a subtraction of the calculated upper-bound from the data point, when the data point is greater than the upper-bound of the confidence interval;

accumulating the divergence indicator of the one or more data points to yield an SDD for the interaction, wherein the SDD is utilized as an agent's self-assessment effectiveness gauge; and (iii) configuring a supervisor dashboard by selectively displaying a subset of the follow-on remedial measures based on the agent's self-assessment effectiveness gauge, wherein said follow-on remedial measures are selected based on the agent's self-assessment effectiveness gauge from at least one of: (i) manager-agent communication; (ii) coaching packages assignment to agents; (iii) rework self-assessment by agent; and (iv) key inputs to agent performance management.

2. The computerized-method of claim 1, wherein said calculating of the confidence interval comprising:

(i) calculating a mean score of the 'n' agents;

(ii) calculating a standard deviation;

(iii) determining a confidence coefficient;
(iv) calculating a lower-bound of the confidence interval by subtracting from the mean score a multiply of the confidence coefficient by the standard deviation divided by a square root of 'n'; and
(v) calculating an upper-bound of the confidence interval by adding to the mean score a multiply of the confidence coefficient by the standard deviation divided by a square root of 'n',
wherein the confidence interval is between the calculated lower-bound and the calculated upper-bound.

3. The computerized-method of claim 1, wherein the one or more preconfigured data points are selected from at least one of:
(i) time taken to fill a self-assessment form;
(ii) a number of times an agent has accessed a recording of the interaction during review of the interaction;
(iii) time taken to review the interaction;
(iv) number of times sessions were expired;
(v) a number of elaborative comments added in relevant fields;
(vi) an interaction length;
(vii) a pattern of selecting identical options across a self-assessment form;
(viii) a number of incomplete form submission attempts;
(ix) a number of intermediate drafts created;
(x) quantum of change during intermediate draft creation; and
(xi) agent's response against controlled questioning.

4. The computerized-method of claim 1, wherein the SDD is sent to one or more applications selected from at least one of; (i) quality management; and (ii) workforce optimization.

5. The computerized-method of claim 1, wherein the accumulating of the divergence indicator of the one or more data points to yield an SDD, for the interaction is a weighted accumulation, and wherein a preconfigured weight is associated to each data point.

6. The computerized-method of claim 1, wherein the one or more preconfigured data points of a sample of 'n' agents, from the one or more systems, are preprocessed before being consolidated into the database of self-assessment data.

7. The computerized-method of claim 1, wherein the one or more systems that the one or more data points are being consolidated from, by the Self-assessment Consolidation module, are further selected from at least one of: (i) quality management; and (ii) Workforce management.

8. A computerized-system for gauging agent's self-assessment effectiveness, in a contact center, the computerized-system comprising:
a database of self-assessment;
one or more processors;
a computer memory to store the database, and a set of program modules executable by the one or more processors,
said one or more processors are configured to operate, for each interaction between an agent and a customer:
(i) operate a Self-assessment Consolidation module to:
monitor via one or more systems, interactions between an agent and a customer and agent actions associated with execution of a form-based self-assessment process executed after each interaction to generate for each interaction one or more preconfigured data points descriptive of the interaction, the one or more systems including at least one agent computer, at least one Automated Call Distribution (ACD) system, and at least one Interactive Voice Response (IVR) system;
consolidate the one or more preconfigured data points of a sample of 'n' agents, from the one or more systems, into the database of self-assessment data;
retrieve the consolidated one or more preconfigured data points of the sample of 'n' agents, from the database of self-assessment data; and
for each data point of the one or more preconfigured data points:
calculate a confidence interval and storing the calculated confidence interval in the database of self-assessment data, wherein said confidence interval an upper-bound and a lower-bound of the confidence interval;
(ii) operate a Self-assessment Divergence Determinant (SDD) module to:
retrieve one or more preconfigured data points of an interaction between the agent and the customer from the database of self-assessment data;
for each data point of the retrieved one or more preconfigured data points of the interaction between the agent and the customer:
retrieve the calculated confidence interval for each preconfigured data point from the database of self-assessment data;
set a divergence indicator as zero, when the data point is within the confidence interval;
set the divergence indicator as a subtraction of the data point from the calculated lower-bound, when the data point is lower than the lower-bound of the confidence interval;
set the divergence indicator as a subtraction of the calculated upper-bound from the data point, when the data point is greater than the upper-bound of the confidence interval;
accumulate the divergence indicator of the one or more data points to yield an SDD for the interaction, wherein the SDD to one or more applications, as is utilized as an agent's self-assessment effectiveness gauge; and
(iii) configuring a supervisor dashboard by selectively displaying a subset of the follow-on remedial measures based on the agent's self-assessment effectiveness gauge,
wherein said follow-on remedial measures are selected based on the agent's self-assessment effectiveness gauge from at least one of: (i) manager-agent communication; (ii) coaching packages assignment to agents; (iii) rework self-assessment by agent; and (iv) key inputs to agent performance management.

9. The computerized-system of claim 8, wherein said calculating of confidence interval comprising:
(i) calculating a mean score of the 'n' agents;
(ii) calculating a standard deviation;
(iii) determining a confidence coefficient;
(iv) calculating a lower-bound of the confidence interval by subtracting from the mean score a multiply of the confidence coefficient by the standard deviation divided by a square root of 'n'; and
(v) calculating an upper-bound of the confidence interval by adding to the mean score a multiply of the confidence coefficient by the standard deviation divided by a square root of 'n', wherein the confidence interval is between the calculated lower-bound and the calculated upper-bound.

10. The computerized-system of claim 8, wherein the one or more preconfigured data points are selected from at least one of:
   (i) time taken to fill a self-assessment form;
   (ii) a number of times an agent has accessed a recording of the interaction during review of the interaction;
   (iii) time taken to review the interaction;
   (iv) number of times sessions were expired;
   (v) a number elaborative comments added in relevant fields;
   (vi) an interaction length;
   (vii) a pattern of selecting identical options across a self-assessment form;
   (viii) a number of incomplete form submission attempts;
   (ix) a number of intermediate drafts created;
   (x) quantum of change during intermediate draft creation; and
   (xi) agent's response against controlled questioning.

11. The computerized-system of claim 8, wherein the SDD is sent to one or more applications selected from at least one of: (i) quality management; and (ii) workforce optimization.

12. The computerized-system of claim 8, wherein the accumulating of the divergence indicator of the one or more data points to yield an SDD, for the interaction is a weighted accumulation, and wherein a preconfigured weight is associated to each data point.

13. The computerized-system of claim 8, wherein the one or more preconfigured data points of a sample of 'n' agents, from the one or more systems, are preprocessed before being consolidated into the database of self-assessment data.

14. The computerized-system of claim 8, wherein the one or more systems that the one or more data points are being consolidated from by the Self-assessment Consolidation module, are further selected from at least one of: (i) quality management; and (ii) Workforce management.

* * * * *